(12) United States Patent
Suga et al.

(10) Patent No.: US 7,799,244 B2
(45) Date of Patent: Sep. 21, 2010

(54) FLUORESCENT OBJECT AND METHOD FOR MANUFACTURING THE SAME

(75) Inventors: Takeshi Suga, Hino (JP); Tomonori Sato, Hachioji (JP); Nobuyuki Suda, Sagamihara (JP); Yukichi Hanayama, Hachioji (JP)

(73) Assignees: Olympus Corporation, Tokyo (JP), part interest; Olympus Medical Systems Corp., Tokyo (JP), part interest ( * ) Notice: Subject to any disclaimer, the term of this patent is extended or adjusted under 35 U.S.C. 154(b) by 480 days.

(21) Appl. No.: 11/896,655

(22) Filed: Sep. 5, 2007

(65) Prior Publication Data

US 2008/0171483 A1 Jul. 17, 2008

(30) Foreign Application Priority Data

Sep. 6, 2006 (JP) ............................. 2006-241928

(51) Int. Cl.
 *B29C 43/00* (2006.01)
(52) U.S. Cl. .................... 252/301.36; 264/21; 600/160; 600/109; 250/458.1; 250/252.1; 359/388; 356/317; 378/44; 524/413; 524/420; 524/430; 524/463
(58) Field of Classification Search ............ 252/301.36; 524/413, 420, 430, 463
See application file for complete search history.

(56) References Cited

U.S. PATENT DOCUMENTS

| | | | |
|---|---|---|---|
| 5,140,060 A | | 8/1992 | Taguchi et al. |
| 5,420,191 A | * | 5/1995 | Howard et al. ............... 524/462 |
| 5,462,705 A | | 10/1995 | Springsteen |
| 5,686,368 A | * | 11/1997 | Wong .......................... 501/152 |
| 5,888,424 A | * | 3/1999 | Ebnesajjad et al. ........ 252/301.5 |
| 5,936,727 A | * | 8/1999 | Trygstad ................... 356/243.5 |
| 2004/0214927 A1 | | 10/2004 | Nitzsche |
| 2005/0117028 A1 | | 6/2005 | Imaizumi et al. |

FOREIGN PATENT DOCUMENTS

| | | |
|---|---|---|
| JP | 2000-154294 | 6/2000 |
| WO | WO 2005/049714 A2 | 6/2005 |

OTHER PUBLICATIONS

SPEX Fluorescence Group; Near-IR Capability of the Fluorolog; 2002.*
Sobolev et al, "Infrared photoluminescence from holmium ions in single crystal silicon and holmium oxide", Semiconductor Science and technology, vol. 15, # 6, Jun. 2000, pp. 511-513.*
Li, Shuwen et al., "Luminescent PTFE Plastics", Shanxi Xingping Chemical Fertilizer Factory, 713100, Apr. 27, 1998.

* cited by examiner

*Primary Examiner*—C. Melissa Koslow
(74) *Attorney, Agent, or Firm*—Arnold International; Bruce Y. Arnold

(57) ABSTRACT

An inexpensive fluorescent object is provided which may be used, for example, as a test object for color adjustment of a fluorescent endoscope system. The fluorescent object generates fluorescence while minimizing the generation of 'noise' at undesired wavelengths, and is made using a plastic that substantially does not deteriorate upon exposure to U.V. and visible radiation. A method of producing the fluorescent object is disclosed, namely, a plastic powder (such as PTFE) and an inorganic fluorescent powder (such as Mn-doped ZnS) are blended so as to form a mixture of these components, and the mixture is then molded by applying pressure to the mixture. An important feature of the invention is that heat is not added during any phase in the production of the fluorescent object, thereby preventing the inorganic fluorescent powder from being denatured when producing the fluorescent object.

9 Claims, 2 Drawing Sheets

FLUORESCENT OBJECT AND METHOD FOR MANUFACTURING THE SAME

This application claims the benefit of foreign priority under 35 U.S.C. §119 of JP 2006-241,928 filed Sep. 6, 2006, the disclosure of which is hereby incorporated by reference.

BACKGROUND OF THE INVENTION

U.S. Pat. No. 5,888,424 discloses a fluorescent object (i.e., an object that generates fluorescence and reflects incident light when illuminated) formed of a matrix material such as plastic that contains, for example, a dispersed material such as a fluorescent powder. For example, a fluorescent object is disclosed that is formed of a fluororesin composition containing an inorganic phosphorus substance that produces fluorescent light when excited by incident light. Also, U.S. Pat. No. 5,462,705 discloses another fluorescent object wherein, to produce the fluorescent object, blended powder is placed within a mold and compressed so that the density of the molded object is adjusted so that the porosity of the fluorescent object is in the range of 30% to 50%. Then, the compressed powder is extracted from the mold and sintered on a ceramic plate in the atmosphere so as to produce the fluorescent object.

Furthermore, U.S. Patent Publication 2005/0117028 discloses a fluorescent object that may be used for color balance adjustment of a fluorescent endoscope system.

The inventions described in U.S. Pat. Nos. 5,888,424 and 5,462,705 each require a heat-treatment process (i.e., a molding process), such as fusion by heating or hardening by heating, making it necessary to select an inorganic fluorescent powder that will not become denatured during the heat-treatment process. Further, in the invention described in U.S. Pat. No. 5,462,705, a dispersant is added so as not to separate or agglutinate the inorganic fluorescent powder. Adding such a dispersant may induce the generation of fluorescent noise or cause the plastic to deteriorate. Further, since a heat treatment process is required, there is a cost increase. In U.S. Patent Publication 2005/0117028, there is no description regarding the material of the fluorescent object. However, in general, fluorescent materials have a problem in that, when excitation light is irradiated onto the fluorescent object, the intensity of fluorescence deteriorates over time due to photo bleaching.

BRIEF SUMMARY OF THE INVENTION

The present invention relates to a fluorescent object that may be used as a standard object for color balance adjustment of a fluorescent endoscope system, and a method of manufacturing the same. The objective of the present invention is to provide an inexpensive fluorescent object that is made of plastic that, when irradiated with excitation light, generates fluorescence without generating fluorescent noise or causing a deterioration of the plastic.

BRIEF DESCRIPTION OF THE DRAWINGS

The present invention will become more fully understood from the detailed description given below and the accompanying drawings, which are given by way of illustration only and thus are not limitative of the invention, wherein.

DETAILED DESCRIPTION

Figure 1:
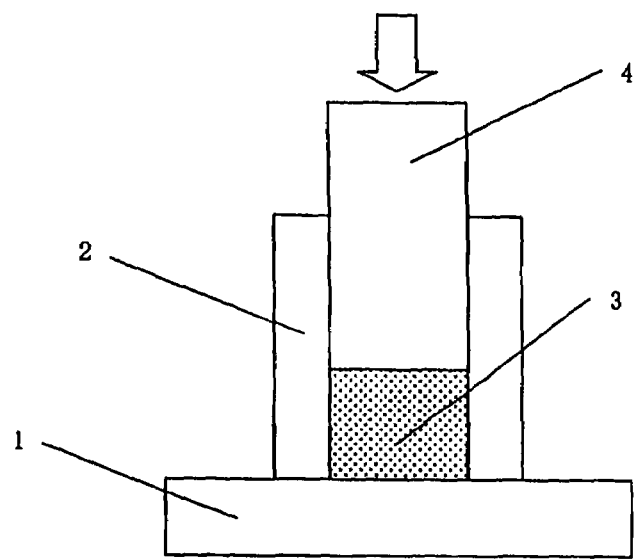
FIG. 1 shows a mold that is used to produce fluorescent objects according to the present invention.

The fluorescent object of the present invention is characterized by:

(1) being produced by compression molding a mixture that is produced by merely blending a plastic powder and an inorganic fluorescent powder. Since the blending and molding processing are conducted without adding heat and no heat is added after the molding during the production of the fluorescent object, inorganic fluorescent powder such as ZnS:Mn, that is easily denatured by heating, can be used without any denaturing occurring. Further, since a dispersant is not required when accomplishing the blending processing, a substance that causes a deterioration of materials is not introduced, thereby preventing fluorescent noise from being generated;

(2) characteristically, the plastic powder is formed of a fluororesin;

(3) the fluorescent object of the present invention is compressed and molded at a pressure of 5 MPa or greater so as to have a porosity of 30% or less so that the resulting increase in density of the fluorescent object has sufficient strength without heat being added (as would occur if a sintering process were performed during the production of the fluorescent object);

(4) in selecting the particle size of the two components of the fluorescent object of the present invention, the average particle size of the inorganic fluorescent powder (typically in the range of 1 to 100 µm) is made less than the average particle size of the fluororesin powder (typically in the range of 1 to 1000 µm), so that the resulting increase in the number of inorganic fluorescent powder particles relative to the number of fluororesin particles in the mixture enables improved dispersion of the inorganic fluorescent particles relative to the fluororesin particles;

(5) characteristically, the fluororesin used is PTFE and the inorganic fluorescent powder used is a selected one from among the following three substances: $ZnS:Mn$, $Y_3Al_5O_{12}:Ce$ and $(Y,Gd)_3Al_5O_{12}:Ce$; and (6) preferably, the weight ratio of inorganic fluorescent powder to PTFE powder in the mixture is in the range 0.1% to 13% (i.e., 0.001:1 to 0.13:1).

When using the fluorescent object of the present invention, illumination may be irradiated onto the fluorescent object while using a fluorescent endoscope system, with the ratio of the fluorescence intensity generated to the reflected light intensity being in the range 0.1:1 to 10:1, which is sufficiently high to enable the color balance of the fluorescent endoscope system to be precisely adjusted without being adversely affected by 'noise' caused by the illumination light being reflected by the fluorescent object.

Using an inorganic fluorescent powder as a fluorescent substance in the fluorescent object of the present invention (wherein heat is not added during the formation of the fluorescent object) enables obtaining a fluorescent object that is stable over a long term (i.e., the fluorescent object exhibits only a small level of photo bleaching). Further, using a fluororesin as the plastic powder in the fluorescent object of the present invention enables obtaining chemically stable characteristics relative to the irradiated light. Therefore, the present invention is ideally suited for use as a fluorescent object for color balance adjustment of a fluorescent endoscope system or a fluorescent microscope system.

In a fluorescent endoscope system, in order to observe what normally is an imperceptible level of fluorescence of a living body, it is necessary to set the fluorescence intensity of the fluorescent object of the invention also to be a normally imperceptible level of fluorescence. Because the fluorescence intensity of general fluorescent powder is excessively strong, inorganic fluorescent powder which is usable for the fluorescent endoscope system is generally limited to manganese-activated zinc sulfide (i.e., manganese-doped zinc sulfide, hereinafter referred to as ZnS:Mn). In the present invention, after blending plastic powder and inorganic fluorescent powder so as to form a mixture, the mixture is molded by compression without heat being added. Because the molding processing is accomplished without heat being added, an inorganic fluorescent powder such as ZnS:Mn (that is easily denaturated by a heating process) can be used. Further, because a dispersant is not required during blending processing, a substance that normally causes a deterioration of materials is not introduced, thereby preventing the generation of fluorescent noise. Also, because heat is not applied, production costs are lower than if heating processing were required. Thus, the present invention provides an inexpensive, fluorescent plastic object that has a stable output with time and that does not generate fluorescent noise.

Several preferred examples of the invention will now be described in detail.

EXAMPLE 1

In this example, the production of a first embodiment of a fluorescent object will be described. PTFE powder, which has a high self-adhesion, is chemically stable relative to any wavelengths of irradiated light, and reflects light, was used as the plastic powder component and manganese-activated zinc sulfide (i.e., ZnS:Mn) was used for the inorganic fluorescent powder component.

In this embodiment, a blend ratio of ZnS:Mn to PTFE of 1.0% by weight was used. In order to evenly disperse the ZnS:Mn component into the PTFE component, ZnS:Mn having a 6 µm average particle size and PTFE having a 30 µm average particle size were used. Using one-fifth of the average particle size for the ZnS:Mn component compared to that of the PTFE component resulted in increasing the absolute number of particles of ZnS:Mn relative to that of PTFE and thus resulted in improved dispersion. Using a PTFE powder having a particle size of 1,000 µm or smaller results in increasing the total surface area of PTFE powder, thus enhancing the self-adhesion of the particles and improving the strength of the fluorescent object. A granulator having a rotary blade was used for blending, and blending processing was performed at 1,200 rpm for 5 minutes.

As shown in FIG. 1, a stainless-steel mold 2 was set on a metal plate 1 with a mirror finish; a blended powder mixture 3 was packed into the mold 2; and pressure at 15 MPa was applied via a stainless-steel punch 4 that was located above the mixture using a hydraulic jack (not shown) to achieve compaction of the blended powder mixture. The surface where the mirror surface of the metal plate 1 is transferred to the blended powder mixture becomes a functional surface as a fluorescent object. The fluorescent object was then extracted from the mold 2 and measured for its density and porosity. The density was 1.8 g/cc or greater and the porosity was 10% or lower.

EXAMPLE 2

In this example, a second embodiment of a fluorescent object will be described. This embodiment was made from the same materials as used in Example 1. However, in this embodiment the blend ratio (by weight) of ZnS:Mn to PTFE was 0.3%. In order to evenly disperse the ZnS:Mn into the PTFE, ZnS:Mn having a 6 µm average particle size and PTFE having an average particle size of 30 µm were used. Just as in Example 1, using one-fifth the average particle size for the ZnS:Mn particles as compared to the average particle size of the PTFE particles resulted in an increase of the absolute number of ZnS:Mn particles relative to that of the PTFE particles, and thus improved the dispersion of the ZnS:Mn particles. Using PTFE powder having a particle size of 1,000 µm or smaller increases the total surface area of the PTFE powder, thus enhancing self-adhesion of the particles and improving the strength of the fluorescent object. A granulator having a rotary blade was used for blending, and blending processing was performed at 1,200 rpm for 5 minutes. Then, the powder was compacted using the same method as used in Embodiment 1. The fluorescent object was then extracted from the mold 2 and measured for its density and porosity. The density was 1.9 g/cc or greater and the porosity was 10% or lower.

EXAMPLE 3

Figure 2:
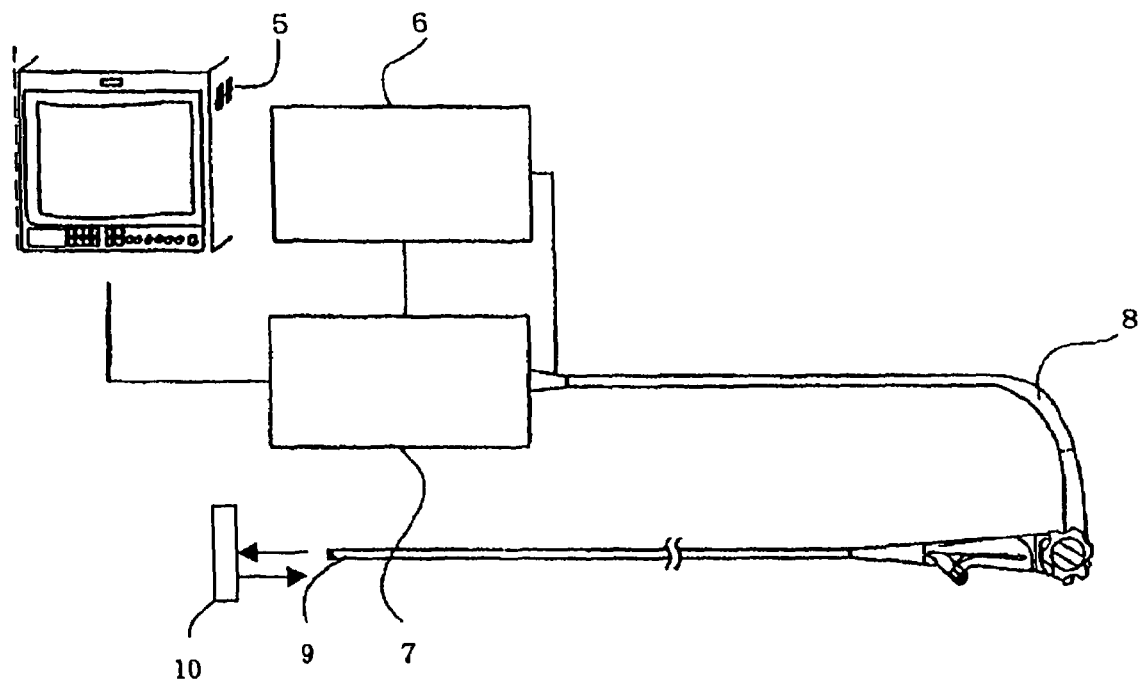
FIG. 2 shows a fluorescent endoscope system that uses a fluorescent object that has been produced according to the present invention.

FIG. 2 shows a fluorescent endoscope system. The fluorescent endoscope system includes a monitor 5 for displaying images, a light source device 6, an image processor 7 and an endoscope 8. Three lights were used so as to irradiate the object, namely, green in a narrow bandwidth, red in a narrow bandwidth, and light that excites fluorescence. These lights were applied sequentially using the light source device 6 via the endoscope 8. Green reflected light, red reflected light, and fluorescence from the object were converted into sequential picture signals by an imaging device that was mounted at an endoscope end 9, and images were processed by the image processor 7. A color image was then displayed on the monitor 5.

An optical filter to produce green in a narrow bandwidth (i.e., that has a transmittance of 0.8% in the wavelength range 540 to 560 nm and that blocks other wavelengths), another optical filter to produce red in a narrow bandwidth (i.e., that has a transmittance of 0.8% in the wavelength range 600 to 620 nm and that blocks other wavelengths), and another optical filter to produce an excitation light to excite fluorescence (i.e., that has a transmittance of 90% in the wavelength range 400 to 440 nm and that blocks other wavelengths), and a lens to converge these lights were contained in the light source device 6.

Also, a filter to block only the excitation light (i.e., that has a transmittance of 90% in wavelength range 470 to 690 nm and that blocks other wavelengths), and a lens that forms an image of an object to be observed were contained in the imaging device that was mounted at the endoscope end 9.

Production flaws of these optical members generate errors in the color balance (i.e., in the relative intensity of the red, green and fluorescence lights displayed) of the monitor at the time of viewing an object. The fluorescent object of the present invention is used as a standard object 10 for color balance adjustment, and the image processor 7 can electrically adjust the color balance so as to have the image signals from the endoscope 8 become the target color balance value.

In order to electrically perform color balance adjustment, it is desirable that the ratio of the intensity of reflected light from the object to the fluorescence intensity be within the range of 1/10 to 10. If the ratio is out of this range, the light intensity cannot be accurately measured because it is affected by electrical noise of the image processor 7 and ambient light (e.g., light in a room) at the time of acquiring the color balance, and thus an error of the color balance adjustment will be generated.

In the fluorescent object of Example 1, a blend ratio (by weight) of ZnS:Mn to PTFE of 1.0% resulted in the realization of the following ratios: the intensity of green light reflected from the object to the intensity of red light reflected from the object to the intensity of the fluorescence were in the proportion of 1:1:0.75; thus, the image processor 7 could electrically correct the error and color balance adjustment was possible. Further, there was also no problem with either the diffusion of reflected light from the object or the intensity of fluorescence from the object.

Further, in the fluorescent object of Example 2, a blend ratio (by weight) of ZnS:Mn to PTFE of 0.3% resulted in the realization of the following ratios: the intensity of green light reflected from the object to the intensity of red light reflected from the object to the intensity of the fluorescence were in the proportion of 1:1:0.3; thus, the image processor 7 could electrically correct the error and color balance adjustment was possible. Further, there was also no problem with either the diffusion of reflected light from the object or the intensity of fluorescence from the object.

Figure 3:
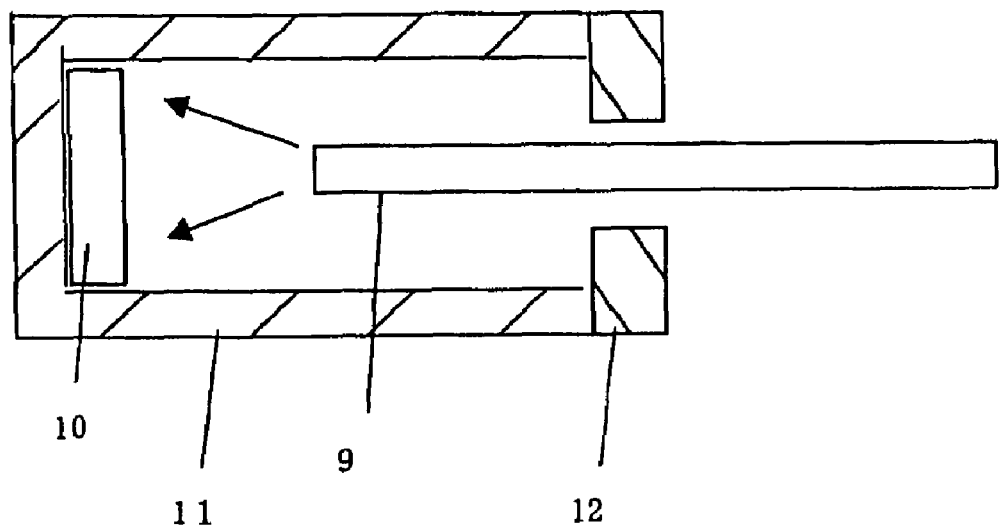
FIG. 3 shows the mechanical structure of a fluorescent object that has been produced according to the present invention.

If the fluorescent object 10 is mounted to a mechanical structure as shown in FIG. 3, damage from unnecessary external forces being applied to the fluorescent object 10 can be avoided. The fluorescent object 10 is retained by a mechanical frame 11, and the mechanical frame 11 is attached and secured to a mechanical frame 12 that reduces outside light. When color balance is to be adjusted, the endoscope end 9 is inserted into the mechanical frame 12. Because the fluorescent object 10 is attached and secured to the mechanical frame 11, a structure is thus provided wherein the application of unnecessary external forces becomes difficult. Such a mounting can be produced by integrally molding the PTFE powder and the fluorescent powder within the mechanical frame 11. In the mechanical frame 12, since an opening where the endoscope end 9 is inserted is established to be small, such a small opening effectively blocks outside light from being incident onto the fluorescent object during color balance. At the same time, such a structure makes the application of unnecessary external forces from the opening side of the mechanical frame 12 difficult (and thus unlikely). Using such a mechanical protective structure as shown in FIG. 3 is acceptable if metal, plastic or cardboard is used for the mechanical frames 11 and 12. Also, it is desirable to paint the internal surfaces of the mechanical frames 11 and 12 black.

EXAMPLE 4

Figure 4:
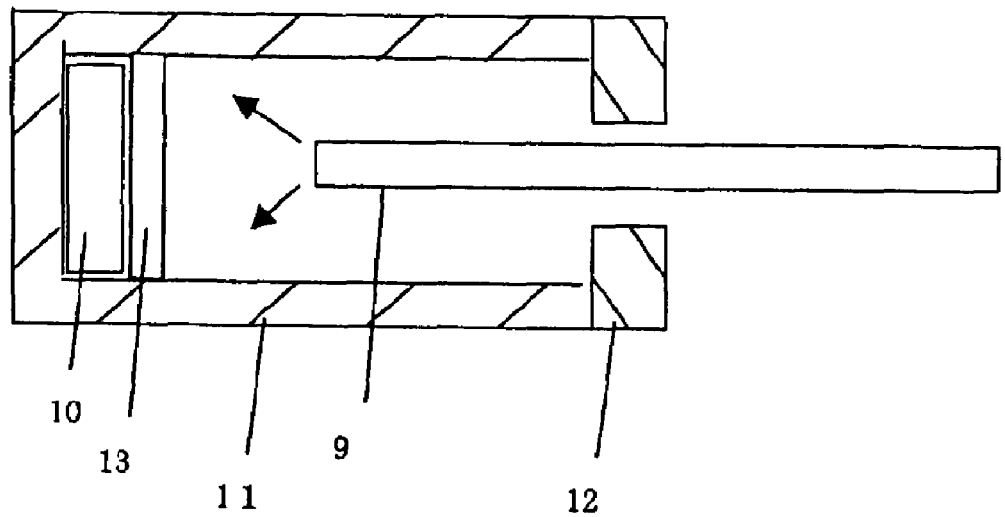
FIG. 4 shows a possible modification to the mechanical structure of the fluorescent object shown in FIG. 3.

FIG. 4 shows a modification to the mechanical structure shown in FIG. 3. In this example, a transparent member 13 is attached and secured to the mechanical frame 11, as illustrated, so as to seal the fluorescent object 10 within the mechanical frame 11 and the transparent member 13. Thus, unnecessary external forces are not applied to the fluorescent object 10. The transparent member 13 can be formed of either glass, transparent resin, or a resin coating.

In the case of the fluorescent object being produced by using 0.1% by weight of ZnS:Mn to PTFE and otherwise being produced using the same method described in Example 1, the relative intensity of green light reflected from the object to that of red light reflected from the object to the fluorescence intensity was 1:1:0.1. Furthermore, in the case of the fluorescent object being produced by using 13% by weight of ZnS:Mn to PTFE and otherwise using the same method as described in Example 1, the relative intensity of green light reflected from the object to that of red light reflected from the object to the fluorescence intensity was 1:1:10. Therefore, it is desirable that the weight ratio of ZnS:Mn to PTFE be within the range from 0.1% to 13%.

The invention being thus described, it will be obvious that the same may be varied in many ways. Changing the type of inorganic fluorescent substance allows the use of color balance adjustment in the fluorescent endoscope system while allowing different wavelengths to be used, such as in the ultraviolet and infrared regions. For the inorganic fluorescent substance (from the viewpoints of safety and fluorescence intensity), it is desirable to select from manganese-activated zinc sulfide (ZnS:Mn), cerium-activated yttrium gadolinium aluminate ($(Y,Gd)_3Al_5O_{12}$:Ce) and cerium-activated yttrium aluminate ($Y_3Al_5O_{12}$:Ce). Moreover, the fluorescent object of the present invention may be used for color balancing a fluorescent endoscope system wherein excitation light is irradiated without using reflected light, and wherein fluorescence is observed in multiple wavelength regions to form color images. In addition, the inorganic fluorescent substance(s) that is/are used may be of multiple types, and may have any fluorescent spectrum, thus making it possible to use inorganic fluorescent substances in multiple types of fluorescent endoscope systems. Also, dyes (such as pigments) may be blended into the mixture used to form the fluorescent object. Thus, it is possible to maintain the intensity ratio of multiple reflected lights constant, thereby enabling the adjustment of color balance for any reflected light(s). The term "fluorescence", as used herein, is inclusive of what may be termed as "phosphorescence". Therefore, inorganic phosphorescent powder may also be used instead of using ZnS:Mn. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. In combination, a fluorescent endoscope system and a fluorescent object produced by the following steps, performed in the order indicated:
    (a) blending a plastic powder and an inorganic fluorescent powder so as to form a mixture of these components;
    (b) compression molding said mixture; and
    (c) not adding heat during steps (a) or (b) or thereafter during the production of the fluorescent object;
   wherein
    said plastic powder is a fluororesin and said mixture is compression molded so that the fluorescent object has a porosity of 30% or lower, and
    said fluorescent object is used as a standard object for color balance adjustment of said fluorescent endoscope system.

2. In combination, a fluorescent microscope system and, a fluorescent object produced by the following steps, performed in the order indicated:
    (a) blending a plastic powder and an inorganic fluorescent powder so as to form a mixture of these components;
    (b) compression molding said mixture; and
    (c) not adding heat during steps (a) or (b) or thereafter during the production of the fluorescent object;

wherein
  said plastic powder is a fluororesin and said mixture is compression molded so that the fluorescent object has a porosity of 30% or lower, and
  said fluorescent object is used as a standard object for color balance adjustment of said fluorescent microscope system.

3. The combination according to claim 1, wherein said fluorescent object is retained by a mechanical frame in order to prevent unnecessary forces from being applied to said fluorescent object.

4. The combination according to claim 2, wherein said fluorescent object is retained by a mechanical frame in order to prevent unnecessary forces from being applied to said fluorescent object.

5. The combination according to claim 1, wherein said fluorescent object is retained by a mechanical frame and a transparent member in order to prevent unnecessary forces from being applied to said fluorescent object.

6. The combination according to claim 2, wherein said fluorescent object is retained by a mechanical frame and a transparent member in order to prevent unnecessary forces from being applied to said fluorescent object.

7. A fluorescent object produced by the following steps, performed in the order indicated:
  (a) blending a plastic powder and an inorganic fluorescent powder so as to form a mixture of these components;
  (b) compression molding said mixture; and
  (c) not adding heat during steps (a) or (b) or thereafter during the production of the fluorescent object;
wherein
  said plastic powder is a fluororesin and said mixture is compression molded so that the fluorescent object has a porosity of 30% or lower;
  the fluororesin plastic powder is PTFE and the weight ratio of said inorganic fluorescent powder to that of the PTFE is in the range 0.1% to 13%; and
  said inorganic fluorescent powder is manganese-activated zinc sulfide with a 6 μm average particle size, and said PTFE has an average particle size of 30 μm.

8. A fluorescent object produced by the following steps, performed in the order indicated:
  (a) blending a plastic powder and an inorganic fluorescent powder so as to form a mixture of these components;
  (b) compression molding said mixture; and
  (c) not adding heat during steps (a) or (b) or thereafter during the production of the fluorescent object;
wherein
  said plastic powder is a fluororesin and said mixture is compression molded so that the fluorescent object has a porosity of 30% or lower;
  the fluororesin plastic powder is PTFE and the weight ratio of said inorganic fluorescent powder to that of the PTFE is in the range 0.1 to 13
  said mixture is compression molded at a pressure of 5 MPa or greater; and
  said inorganic fluorescent powder is manganese-activated zinc sulfide with a 6 μm average particle size, and said PTFE has an average particle size of 30 μm.

9. A method of producing a fluorescent object, said method comprising the following steps, performed in the order indicated:
  (a) blending plastic powder and inorganic fluorescent powder so as to form a mixture of these two components;
  (b) molding the mixture produced in step (a) by applying pressure to the mixture; and
  (c) not adding heat during steps (a) or (b) or thereafter during the production of the fluorescent object;
wherein
  said plastic powder is a fluororesin and said mixture is compression molded so that the fluorescent object has a porosity of 30% or lower,
  said fluororesin is PTFE having an average particle size of 30 μm, and
  said inorganic fluorescent powder is manganese-activated zinc sulfide with a 6 μm average particle size.

* * * * *